(12) United States Patent
Chanda et al.

(10) Patent No.: US 10,129,083 B2
(45) Date of Patent: Nov. 13, 2018

(54) METHODS FOR OPTIMIZING AN OVER-THE-AIR UPDATE USING A LIGHTWEIGHT DEVICE UPDATE PROTOCOL (LWDUP)

(71) Applicant: Wipro Limited, Bangalore (IN)

(72) Inventors: Debasish Chanda, Maheshtala (IN); Swarup Mandal, Kolkata (IN)

(73) Assignee: Wipro Limited, Bangalore (IN)

( * ) Notice: Subject to any disclaimer, the term of this patent is extended or adjusted under 35 U.S.C. 154(b) by 229 days.

(21) Appl. No.: 15/069,705

(22) Filed: Mar. 14, 2016

(65) Prior Publication Data

US 2017/0264481 A1 Sep. 14, 2017

(30) Foreign Application Priority Data

Feb. 24, 2016 (IN) .............................. 201641006460

(51) Int. Cl.
*H04L 12/24* (2006.01)
*H04L 29/06* (2006.01)

(52) U.S. Cl.
CPC ............ *H04L 41/082* (2013.01); *H04L 69/03* (2013.01)

(58) Field of Classification Search
CPC ............................. H04L 41/082; H04L 69/03
See application file for complete search history.

(56) References Cited

U.S. PATENT DOCUMENTS

| | | | |
|---|---|---|---|
| 2004/0098715 A1 | 5/2004 | Aghera et al. | |
| 2013/0125107 A1* | 5/2013 | Bandakka ............... | G06F 8/665 717/171 |
| 2013/0201839 A1* | 8/2013 | Ree ..................... | H04L 43/0847 370/252 |

OTHER PUBLICATIONS

Research article "OMA DMv1.x compliant Lightweight Device Management for Constrained M2M devices" (2013) to Chu et al. ("Chu").*
Deliverable WP4/D4.3 "Exalted Expanding LTE for Devices D4.3-Device Management" (Oct. 31, 2012) to Exalted Consortium ("Exalted").*
IETF draft "Block-wise transfers in CoAP" (Sep. 15, 2015) to Borman et al. ("Borman").*
"OMA Device Management V1.3", 2016, Open Mobile Alliance.
"Enabler Release Definition for OMA Device Management Candidate", Jun. 7, 2005, pp. 1-14, Version 1.2, Open Mobile Alliance Ltd., Retrieved from the Internet<URL: http://www.openmobilealliance.org/release/DM/V1_2-20050607-C/OMA-ERELD-DM-V1_2-20050607-C.pdf>.
"Enabler Release Definition for OMA Device Management Candidate", Mar. 9, 2010, pgs. 1-13, Version 2.0, Open Mobile Alliance Ltd., Retrieved from the Internet<URL: http://www.openmobilealliance.org/release/DM/V2.0-20100309-C/OMA-ERELD-DM-V2_0-20100309-C.pdf>.
"Firmware Update Management Object", Jun. 15, 2006, Candidate pp. 1-32, Version 1.0, Open Mobile Alliance.

(Continued)

*Primary Examiner* — June Y Sison
(74) *Attorney, Agent, or Firm* — LeClairRyan PLLC

(57) ABSTRACT

Methods, devices, and non-transitory computer readable media optimize an over-the-air update include identifying initiation of an over-the-air update for a client computing device. The update is retrieved from a content server based on the identifying and utilizing a first protocol. The update to the client computing device is divided into a plurality of data segments which are sequentially downloaded utilizing a second protocol which is different from the first protocol.

17 Claims, 17 Drawing Sheets

(56) References Cited

OTHER PUBLICATIONS

Chu, et al., "Large Scale Integrating Project, Exalted, Expanding LTE for Devices", Report, Oct. 31, 2012, pp. 1-149, Version1.0, Exalted Consortium.
"Download Over the Air Architecture", Mar. 29, 2011, pp. 1-39, Version 2.0, Open Mobile Alliance.
Prashant, "JCB to Ride on M2M Bandwagon; Launches Livelink", Jul. 16, 2015, Teleanalysis.
"OMA Download Over the Air V2.0", 2016, Open Mobile Alliance.

* cited by examiner

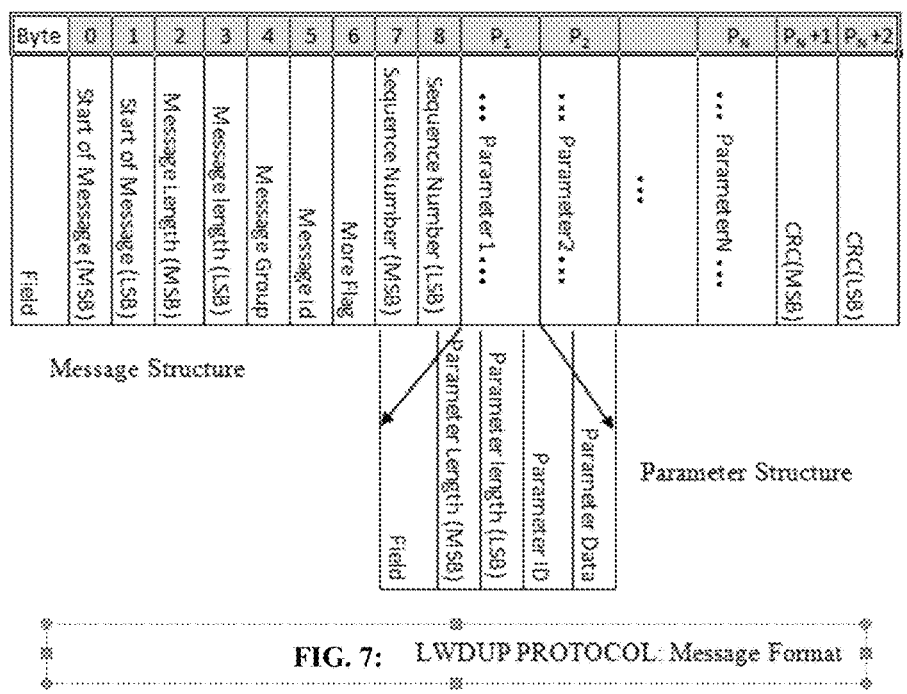
FIG. 7: LWDUP PROTOCOL Message Format

Table 1: Message Structure

| Field | Description |
|---|---|
| Start of Message | Indicates the start of message. Store 0x40 0x40 |
| Message Length | Size of whole message in bytes including Start of Message, Message Length, Message Group, Message Id, All Parameters and CRC |
| Message Group | Message Group Name. Refer Table 3 for more details |
| Message ID | Message Identifier. Refer Table 3 for more details |
| More Flag | True, if this indicates the message is segmented. False Otherwise. |
| Sequence Number | Sequence Number of the segments |
| Parameters | Parameters for this message. Refer Table 2 for more details about Parameter Structure |
| CRC | CRC calculated using whole message including Start of Message, Message Length, Message Group, Message Id and All Parameters. CRC Algorithm will be as mentioned in CRC Algorithm Section. |

FIG. 8

Table 2: Parameter Structure

| Field | Description |
|---|---|
| Parameter length | Length of Parameter in bytes, including parameter length field, parameter ID and Parameter data |
| Parameter ID | Interpretation of Parameter Specific |
| Parameter Data | Type of data is determined by the parameter ID for specific message ID |

FIG. 9

Table 3: Message Group & Message ID

| Message Group | Message ID | Description |
| --- | --- | --- |
| SESSION_ESTABLISH | | Messages related to establish DM session |
| | SERVER_ALERT | Server Initiated Request |
| | CLIENT_ALERT | Device Initiated Request |
| | AUTH_REQ | Authentication request from Device Proxy. |
| | AUTH_RES | Authentication response from Device |
| | DEV_CAP_INFO | Device Capability Details |
| SW_DOWNLOAD | | Messages related to Download |
| | DOWNLOAD_REQ | Download Request from Device Proxy |
| | DEV_CAP_CHECK | Device capability check with download size |
| | DEV_CAP_CONF | Confirm (Success/Fail) based on Memory availability |
| | ADAPT_DEV_CAP | If channel is noisy, this message would be sent from Device proxy so that segment size can be adapted to produce better throughput. Default segment size is 1 KB. |
| | SCRAMBLE_CONTENT_REQ | Request from Device proxy if device supports to decipher scramble content. Content Scrambling is done as shown in Scrambling algorithm |
| | SCRAMBLE_CONTENT_CONF | Confirm success/fail depending on scrambling support |
| | CONTENT_GET | Content is transferred to Device. More Flag and Sequence number would indicate the segment and whether it is last packet |
| | CONTENT_ACK | Acknowledgement of content if packet received is OK |
| | DOWNLOAD_COMP | Download is completed |
| SW_UPDATE | | |
| | UPDATE_CONF | Software Update is complete |

FIG. 10

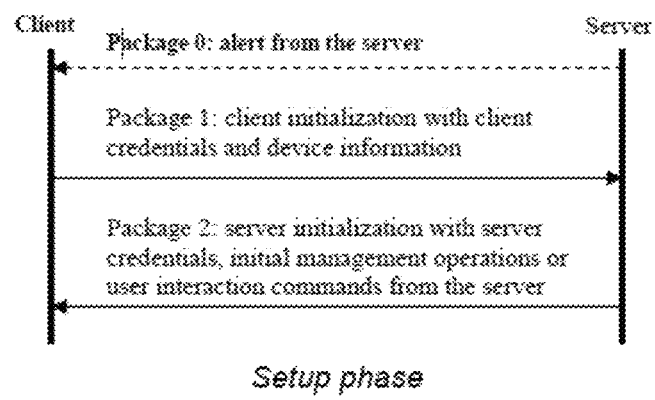
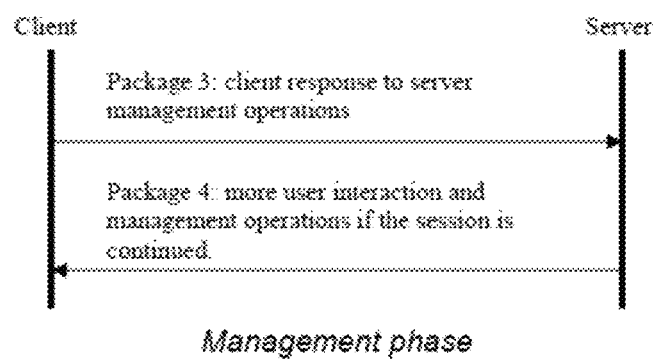
FIG. 11 (Prior Art)

METHODS FOR OPTIMIZING AN OVER-THE-AIR UPDATE USING A LIGHTWEIGHT DEVICE UPDATE PROTOCOL (LWDUP)

This application claims the benefit of Indian Patent Application Serial No. 201641006460 filed Nov. 24, 2016, which is hereby incorporated by reference in its entirety.

FIELD

This technology relates to methods for optimizing an over-the-air update for a resource constrained device using a light weight device update protocol (LWDUP) and devices thereof.

BACKGROUND

Currently, distributed embedded smart devices that are connected to networks, such as a wide area network, Internet, or wireless network, are used in a variety of application areas, such as banking, ticket reservation, kiosk, manufacturing, marketplaces, and payment counters by way of example. The continuing rapid growth of smart devices coupled with a faster pace of application development is leading to a problem of maintainability and scalability of these smart devices.

To make these smart devices scalable and maintainable in the current context, frequent updates of software or firmware installed on these smart devices are necessary because consumers expect their devices to stay updated to the latest application releases. Accordingly, updating these smart devices in a timely manner Over-The-Air (OTA) has been an answer to this expectation.

Unfortunately, a major challenge to executing this OTA updating is the lack of resources, such as insufficient flash memory, RAM, and/or CPU power by way of example, in these smart devices. The limited bandwidth connecting these smart devices often negatively affects the performance of these OTA updates. Additionally, these updates often require a good amount of data transmission security to be implemented. This in turn requires a network with higher bandwidth and higher processing capability in these smart devices, neither of which is always available.

By way of example, a conventional deployment of an OTA update solution is shown in FIG. 1 where a device management (DM) server 14 uses Open Mobile Alliance Device Management (OMA-DM) and Open Mobile Alliance Download Over-The Air) (OMA-DL) protocols in conjunction with a content server 16 to deliver update content to a client computing device 12 (also referred to herein in the examples herein as an embedded device or a resource constrained computing device). Unfortunately, these protocols are not efficient from both protocol semantics (i.e. Message Exchanges) as well as syntax (i.e. Payload Structure) perspective for the client computing device 12 which has limited computing resources A more detailed functional block diagram of an architecture for an OMA-DM and OMA-DL based solution for implementing this conventional deployment of an OTA update is illustrated in FIG. 2. In this example, at step 100 the DM server 14 notifies a DM Transport Client module of the client computing device 12 about an available update, i.e. in this example a server initiated update, although other options for initiating the updated may be used, such as a request for an update initiated from the client computing device 12 by way of example. At step 102, the DM Transport Client module of the client computing device 12 queries device capability information (DevInfo) from a Configuration Manager module of the client computing device 12. At step 104, the DM server 14 and the Transport Client module of the client computing device 12 exchange OMA-DM commands to establish a DM Session using the DevInfo received in step 102.

At step 106, the DM Transport Client module of the client computing device 12 updates a Firmware Update Management Object Database (FUMO DB) of the client computing device 12 with the details created in step 104. At step 108, a Download Manager module of the client computing device 12 periodically monitors the FUMO DB for a new entry and collects Content Server 16 related information from the FUMO DB, in case of a new entry in the FUMO DB. At step 110, for a new entry in the FUMO DB, the Download Manager module of the client computing device 12 initiates a software download following OMA-DL and using the information obtained in step 108 and then updates the FUMO DB upon completion.

At step 112, an Update Manager module of the client computing device 12 periodically checks FUMO DB for any newly downloaded upgraded software. At step 114, in case the Update Manager module of the client computing device 12 finds newly downloaded upgraded software, the Update Manager module utilizes a device specific Updater Application module of the client computing device 12 to update the client computing device 12 with the new upgraded software using a conventional patch upgrade technique. At step 116, upon completion the Update Manager module of the client computing device 12 notifies the DM server 14 about the software update status using OMA-DM commands. Unfortunately, as noted earlier this convention deployment process does not address any of the challenges related to situation with limited bandwidth and/or lack of resources noted above.

SUMMARY

A method for optimizing an over-the-air update include identifying, by a device proxy initiation of an over-the-air update for a client computing device. The update is retrieved from a content server based on the identifying and utilizing a first protocol. The update to the client computing device is divided into a plurality of data segments which are sequentially downloaded utilizing a second protocol which is different from the first protocol.

A device proxy computing apparatus includes a memory coupled to a processor which is configured to be capable of executing programmed instructions, which comprise the programmed instructions stored in the memory to identify initiation of an over-the-air update for a client computing device. The update is retrieved from a content server based on the identifying and utilizing a first protocol. The update to the client computing device is divided into a plurality of data segments which are sequentially downloaded utilizing a second protocol which is different from the first protocol.

A non-transitory computer readable medium having stored thereon instructions for optimizing an over-the-air update comprising machine executable code which when executed by a processor, causes the processor to perform steps to and that comprise identify initiation of an over-the-air update for a client computing device. The update is retrieved from a content server based on the identifying and utilizing a first protocol. The update to the client computing device is divided into a plurality of data segments which are sequentially downloaded utilizing a second protocol which is different from the first protocol.

This technology provides a number of advantages including methods, devices, and non-transitory computer readable media that effectively optimize implementation of an over-the-air update for a resource constrained device. With this technology, OTA downloads of updates to resource constrained computing devices is substantially improved. Example of this technology reduce the data overhead while downloading an OTA update to a resource constrained computing device by introducing a device proxy computing apparatus between the entities from which the data is downloaded and the resource constrained computing device. Additionally, examples of this technology may also utilize a new light weight device update protocol (LWDUP) for secure and robust communication, i.e. can work in relatively poorer network coverage, which reduces the overhead both from protocol semantics and syntax to facilitate completion of the OTA update. Further, examples of this technology are able to dynamically adjust the segmenting during the downloading of the update based on detecting and adapting to dynamic network conditions.

BRIEF DESCRIPTION OF THE DRAWINGS

FIG. 7 is a diagram of an example of a light weight device update protocol (LWDUP) which can be used for examples of the method for optimizing an over-the-air update for a resource constrained device;

FIG. 8 is a table of an example of message structure for LWDUP;

FIG. 9 is a table of an example of a parameter structure for LWDUP;

FIG. 10 is a table of an example of a message group and message ID for LWDUP;

FIG. 11 is a diagram of an example of a conventional device management implementation using OMA-DM;

DETAILED DESCRIPTION

Figure 3:
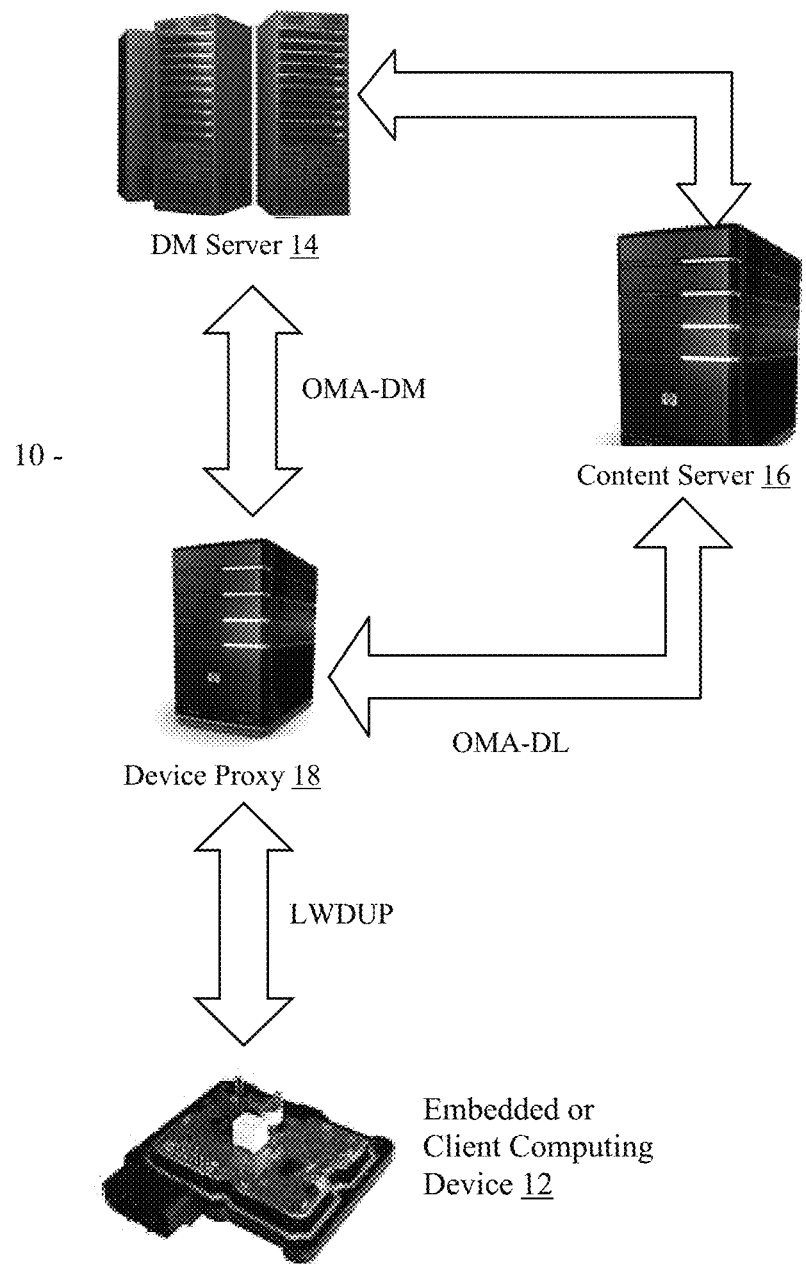
FIG. 3 is a diagram of an example of an environment with a device proxy computing apparatus that optimizes an over-the-air update for a resource constrained device.
Figure 4:
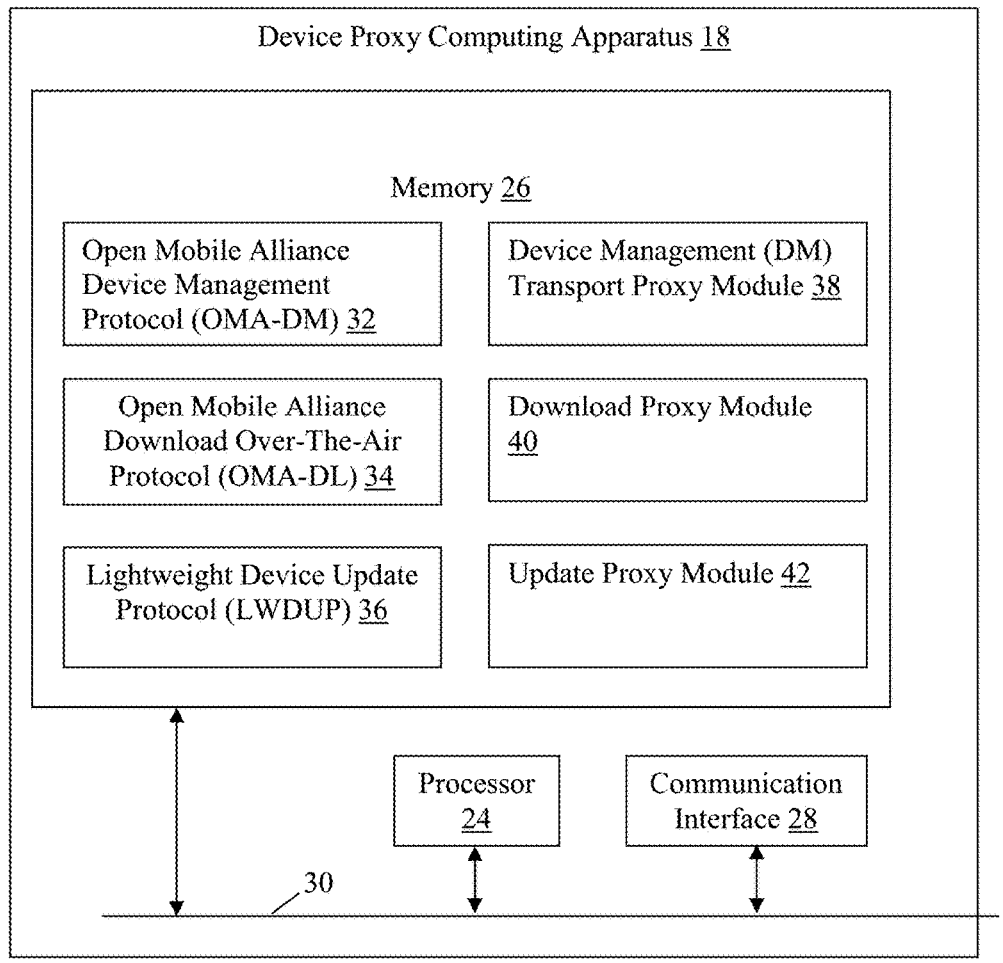
FIG. 4 is a block diagram of the device proxy computing apparatus illustrated in FIG. 3.
Figure 6:
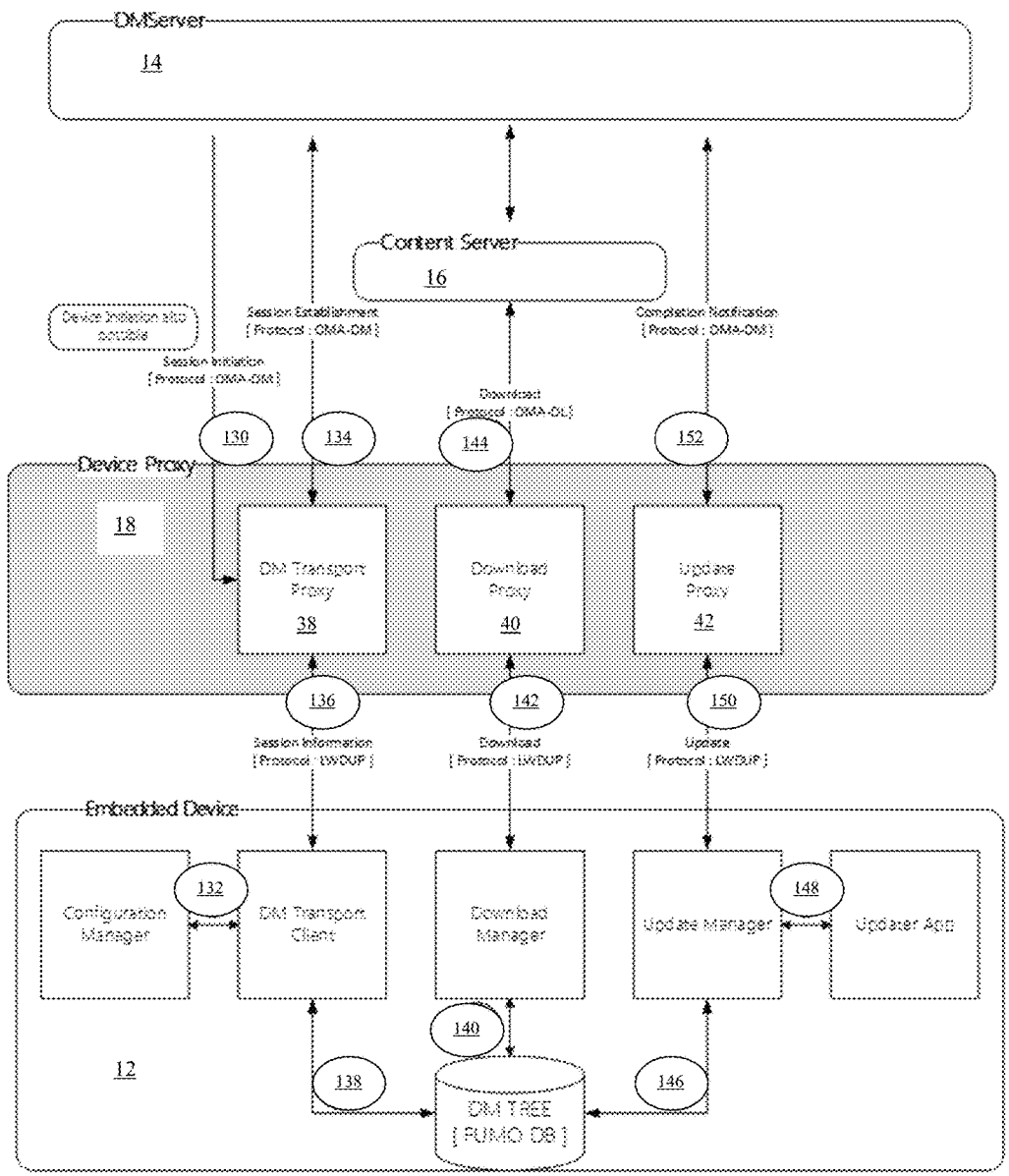
FIG. 6 is a functional block diagram of an example of an architecture for optimizing an over-the-air update for a resource constrained device.

An environment 10 with an example of a device proxy computing apparatus 18 that optimizes an over-the-air update for a resource constrained device is illustrated in FIGS. 3, 4, and 6. In this particular example, the environment 10 includes an client computing device 12, device management (DM) server 14, a content server 16, and the device proxy computing apparatus 18 coupled via one or more communication networks, although the environment could include other types and numbers of systems, devices, components, and/or other elements in other configurations. Additionally, in this particular example, the update or update data refers to any data that is part of a software/firmware release, version updates for the software/firmware already installed on the client computing device, data related to bug fixes, security enhancements, and/or any new installable content. This technology provides a number of advantages including providing methods, devices, and non-transitory computer readable media that optimize implementation of an over-the-air update for a resource constrained device.

Figure 1:
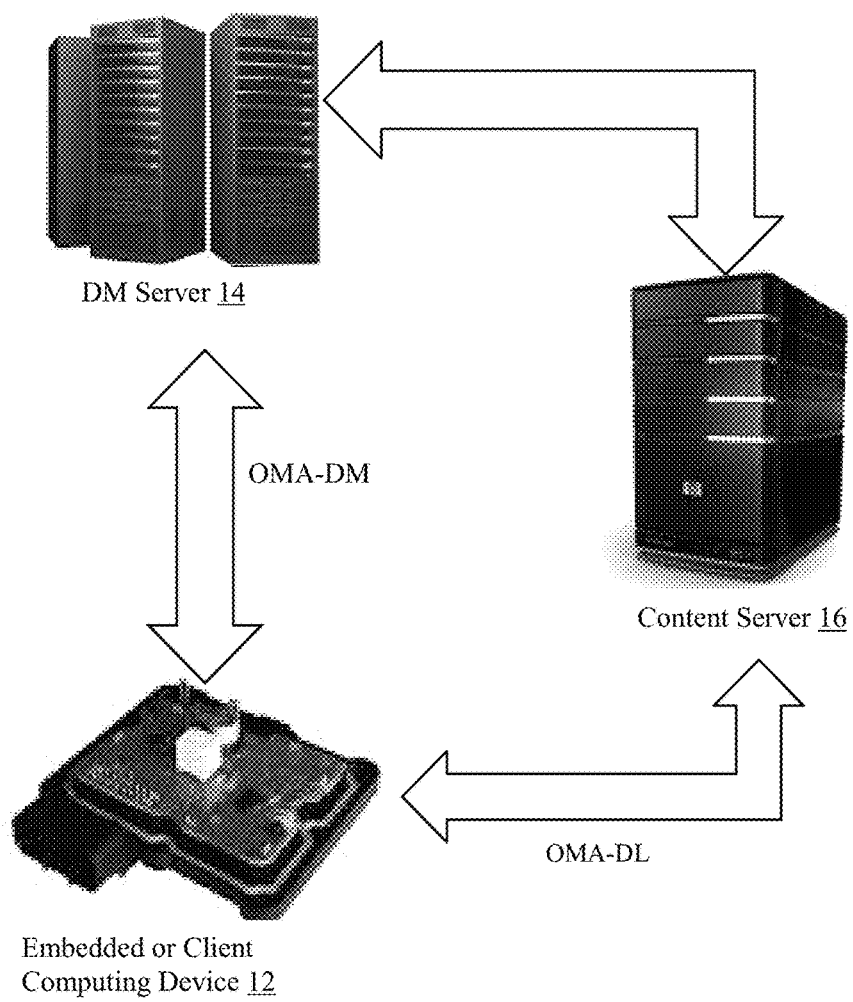
FIG. 1 is a diagram of an example of a prior art conventional deployment environment.
Figure 2:
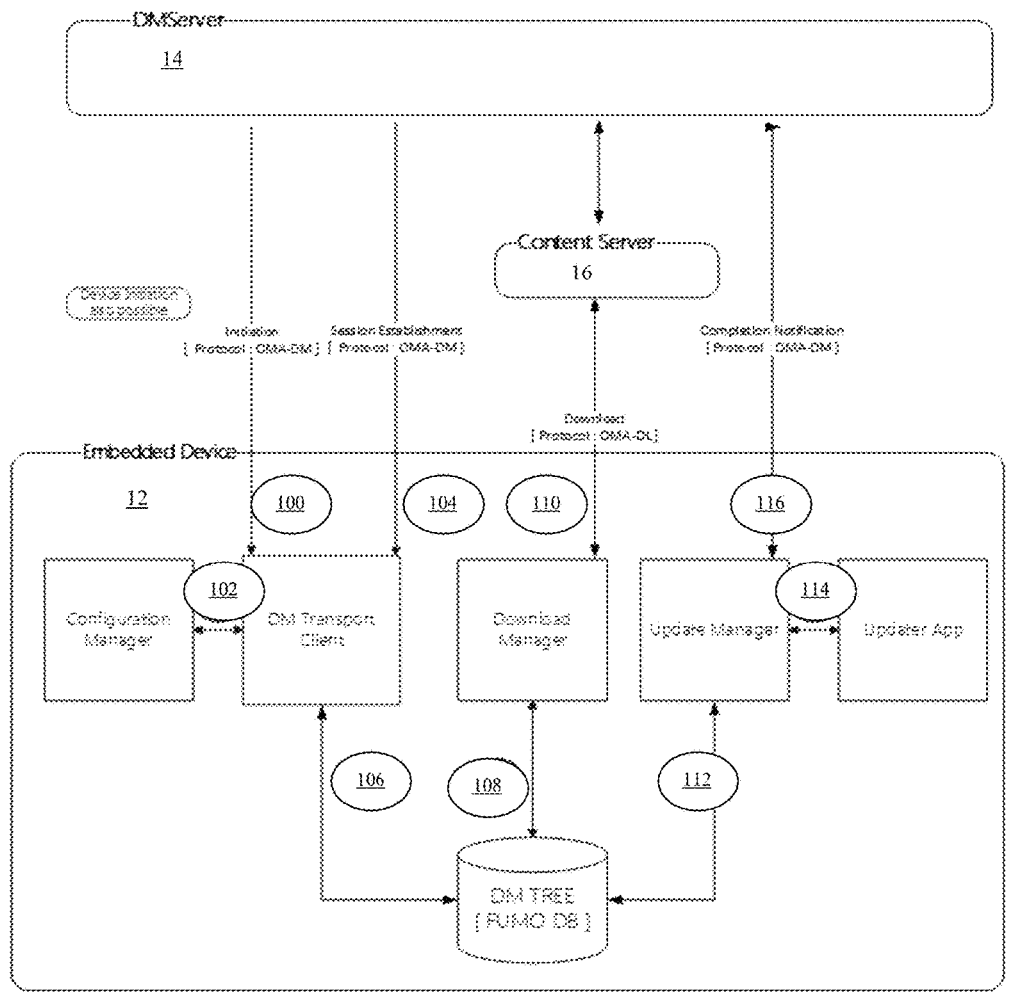
FIG. 2 is a functional block diagram of an example of a prior art architecture for an OMA-DM and OMA-DL based solution for implementing a conventional deployment of an OTA update.

Referring more specifically to FIGS. 1-2, the device proxy computing apparatus 18 may include a processor 24, a memory 26, and a communication interface 28 which are coupled together by a bus 30, although the device proxy computing apparatus 18 may include other types and/or numbers of physical and/or virtual systems and/or processors, devices, components, and/or other elements in other configurations.

The processor 24 of the device proxy computing apparatus 18 may execute one or more programmed instructions stored in the memory 26 for effectively optimizing an over-the-air update as illustrated and described in the examples herein, although other types and/or numbers of instructions can be performed. The processor 24 of the device proxy computing apparatus 18 may include one or more central processing units and/or general purpose processors with one or more processing cores, for example.

The memory 26 of the device proxy computing apparatus 18 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a, hard disk, CD ROM, DVD ROM, or other computer readable medium which is read from and written to by a magnetic, optical, or other reading and writing system that is coupled to the processor 24, can be used for the memory 26. In this particular example, the memory 26 includes programmed instructions and/or data for an Open Mobile Alliance Device Management protocol (OMA-DM) 32, an Open Mobile Alliance Download Over-The-Air protocol (OMA-DL) 34, a Lightweight Device Update Protocol (LWDUP) 36, a Device Management (DM) Transport Proxy module 38, a Download Proxy module 40, and an Update Proxy module 42, although the memory 26 can comprise other types and/or numbers of other modules, programmed instructions and/or other data. The Open Mobile Alliance Device Management protocol (OMA-DM) 32 is illustrated and described in http://technical.openmobilealliance.org/Technical/technical-information/release-program/current-releases/dm-v1-2 which is herein incorporated by reference. The Open Mobile Alliance Download Over-The-Air protocol (OMA-DL) 34 is illustrated and described in http://technical.openmobileallinace.org/Technical/technical-information/release-program/current-releases/download-ota-v2-0 which is herein incorporated by reference. The lightweight Device Update Protocol (LWDUP) 36 for examples of this technology is further illustrated and described herein. The instructions, steps, and/or data of the Device Management (DM) Proxy module 38, the Download Proxy module 40, and the Update Proxy module 42 are illustrated and described by way of the examples herein, although other types and/or number of instructions steps, and/or data may be used.

In this particular example, the DM Transport Proxy module 38 of the device proxy computing apparatus 18 may comprise programmed instructions configured to be capable of identifying an available update for the client computing device 12, such as based on a DM server 14 initiated notice of an available update, by a request for the update received from the client computing device 12, or by a periodic check based on a stored update schedule for any available update by way of example only. The DM Transport Proxy module 38 of the device proxy computing apparatus 18 may also comprise programmed instructions configured to be capable of collecting device capability information (DevInfo) from a DM Transport Client module in the client computing device 12 using in this example the LWDUP which in turns gets the DevInfo from a Configuration Manager of the client computing device 12. Additionally, the DM Transport Proxy module 38 of the device proxy computing apparatus 18 may comprise programmed instructions configured to be capable of exchanging OMA-DM commands to establish a DM Session on behalf of the client computing device 12 using details obtained from the client computing device 12. Further, the DM Transport Proxy module 38 of the device proxy computing apparatus 18 may comprise programmed instructions configured to be capable of notifying the DM Transport Client upon completion of session establishment using by way of example the LWDUP 36.

In this particular example, the Download Proxy module 40 of the device proxy computing apparatus 18 may comprise programmed instructions configured to be capable of initiating an OMA-DL Session with the content server 16 to download the update, such as upgraded software by way of example only. Additionally, the Download Proxy module 40 of the device proxy computing apparatus 18 may comprise programmed instructions configured to be capable of notifying the Download Manager of the client computing device 12 using LWDUP upon successful downloading the update.

In this particular example, the Update Proxy module 42 of the device proxy computing apparatus 18 may comprise programmed instructions configured to be capable of notifying the DM server 14 upon completion of the software update based on a received notice from the Update Manager module of the client computing device 12.

The communication interface 28 of the device proxy computing apparatus 18 operatively couples and communicates between the client computing device 12, the device management (DM) server 14, and the content server 16 over one or more communication networks, by way of example only an over-the-air network, although other types and/or numbers of communication networks or systems with other types and/or numbers of connections and configurations to other devices and/or elements. The communication networks in this example may employ any suitable interface mechanisms and/or network communication technologies.

In this particular example, the client computing device 12 may include a processor, a memory, and a communication interface, which are coupled together by a bus or other link, although each could have other types and/or numbers of elements. The processor of the client computing device 12 may include one or more central processing units and/or general purpose processors with one or more processing cores by way of example only. The memory of the client computing device 12 stores the programmed instructions and/or other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a, hard disk, CD ROM, DVD ROM, or other computer readable medium which is read from and written to by a magnetic, optical, or other reading and writing system that is coupled to the processor for the client computing device 12, can be used for the memory for the client computing device 12.

In this particular example, the memory for the client computing device 12 may include a configuration manager, a device management (DM) transport module, a download manager module, an update manager module, and an updater application, although this memory can comprise other types and/or numbers of other modules, programmed instructions and/or other data. The instructions, steps, and/or data of the configuration manager module, the device management (DM) transport module, the download manager module, the update manager module, and the updater application are illustrated and described by way of the examples herein.

In this particular example, the DM Transport Client module of the client computing device 12 may comprise programmed instructions to query device capability information (DevInfo) from the Configuration manager of the client computing device 12. The DM Transport module of the client computing device 12 may also comprise programmed instructions configured to be capable of updating the Firmware Update Management Object Database (FUMO DB).

In this particular example, the Download Manager of the client computing device 12 may comprise programmed instructions configured to be capable of periodically monitoring the FUMO DB for a new entry and collecting content server 16 related information from the FUMO DB, in case of a new entry in the FUMO DB. The Download Manager of the client computing device 12 may also comprise programmed instructions configured to be capable of notifying the Download Proxy module 40 of the device proxy computing apparatus 18 with relevant data upon finding a new entry in FUMO DB. Additionally, the Download Manager of the client computing device 12 may comprise programmed instructions configured to be capable of downloading the update, such as upgraded software by way of example only, from the Download Proxy module 40 of the device proxy computing apparatus 18. Further, the Download Manager of the client computing device 12 may comprise programmed instructions configured to be capable of updating the entry in the FUMO DB.

In this particular example, the Update Manager of the client computing device 12 may comprise programmed instructions configured to be capable of periodically checking the FUMO DB for any new update, such as a newly downloaded upgrade to software by way of example only. The Update Manager of the client computing device 12 may also comprise programmed instructions configured to be capable of utilizing a device specific Updater Application in the client computing device to update the client computing device 12 with the new upgraded software using conventional patch upgrade technique when any newly downloaded software is found. Additionally, the Update Manager of the client computing device 12 may comprise programmed instructions configured to be capable of notifying the Update Proxy module 42 in the device proxy computing apparatus 18 about the software update status.

The DM server 14 may include a processor, a memory, and a communication interface, which are coupled together by a bus or other link, although the DM server 14 may have other types and/or numbers of other elements. The DM server 14 may comprise programmed instructions configured to be capable of notifying the DM Transport proxy module of the device proxy computing apparatus 18 of a new update, establishing a session with the DM Transport proxy module of the device proxy computing apparatus 18, and/or receiving a notification of the completion of an update by way of example only.

The content server 16 may include a processor, a memory, and a communication interface, which are coupled together by a bus or other link, although the content server 16 may have other types and/or numbers of other elements. The content server 16 may comprise programmed instructions configured to be capable of downloading the update to the Download proxy module 40 of the device proxy computing apparatus 18 by way of example only Although the exemplary network environment 10 with the client computing device 12, the DM server 14, the content server 16, the device proxy computing apparatus 18, and one or more communication networks are illustrated and described herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 5:
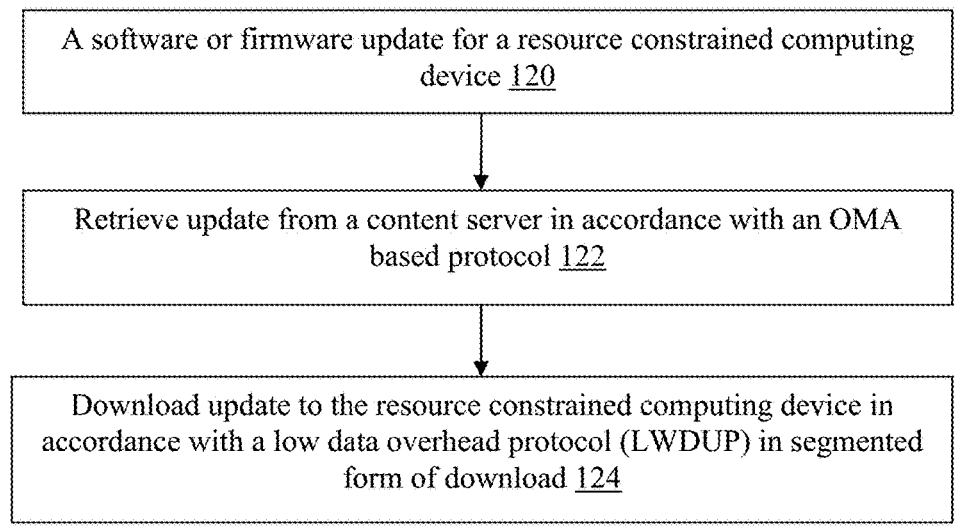
FIG. 5 is a flow chart of an example of a method for optimizing an over-the-air update for a resource constrained device.

An example of a method for optimizing an over-the-air update for a resource constrained device will now be described with reference to FIGS. 3-18. Referring more specifically to FIG. 5, an example of an overall method for performing an OTA update of the client computing device 12 using the device proxy computing apparatus 18 is illustrated.

At step 120, the device proxy computing apparatus 18 identifies a need for an update for the client computing device 12. In this particular example, the device proxy computing apparatus 18 identifies the need for the update for the client computing device 12 based on receiving a notice about the availability of the update from the DM server 14, although other manners for identifying the need for an update can be used. By way of example only, the device proxy computing apparatus 18 may receive a request for the update from the client computing device 12 for the update or based on a stored update schedule the device proxy computing apparatus 18 periodically check for any updates for the client computing device 12.

At step 122, the device proxy computing apparatus 18 may initiate and then complete the downloading of the update from a content server 18 to the device proxy computing apparatus 18 in accordance with the OMA_DL protocol 34, although the content may be obtained in other manners using other protocols and/or from other sources. In particular, in this example the device proxy computing apparatus 18 initiates the OMA_DL session with the content server 16 to download the update from the content server 16. Once the download is completed at the device proxy computing apparatus 18, the device proxy computing apparatus 18 notifies the client computing device 12 of the download using a suitable protocol that has low data overhead, such as the new LWDUP by way of example only.

At step 124, the device proxy computing apparatus 18 may segment the update and download the segments of the update to the client computing device 12 using a suitable protocol that has low data overhead, such as the new LWDUP by way of example only. By way of example only, the device proxy computing apparatus 18 may detect one or more network conditions associated with the client computing device 12, such as available network bandwidth by way of example only, and dynamically adjust a size or other aspect of the segments of the update based on the detected one or more network conditions. Since the update is downloaded by the device proxy computing apparatus 18 in multiple segments in a sequential manner, if the client computing device 18 goes out of the network coverage during the download process, the device proxy computing apparatus 18 may resume the download to the client computing device 12 when network coverage is available from the point at which the client computing device 12 went out of the network coverage. Accordingly, this example of the LWDUP for downloading the update between the client computing device 12 and the device proxy computing apparatus 18 offers the robustness with its adaptability to existing network conditions to continue the session once established thereby reducing the retransmission effort and need while the update is in progress for the client computing device 12. Once the update from the device proxy computing apparatus 18 to the client computing device is completed, then the client computing device 12 may install the received update.

By way of example only, a more detailed illustration and description of the Light Weight Device Update Protocol' (LWDUP) for secure communication between the Embedded Device and the Device Proxy and for reducing the overhead both from protocol semantics and syntax is provided herein, although other low data protocols could be used. In this particular example, all forms of communication including session initiation, establishment, download, and acknowledgement messages between the client computing device 12 and the device proxy computing apparatus 18 are done using the LWDUP only, as opposed to the OMA based protocol that would otherwise require higher resources to be present with the client computing device 12. Additionally, although an LWDUP is used with this example, any protocol that reduces data overhead and provide secure data exchange between the client computing device 12 and the device proxy computing apparatus 18 may be used in place of the LWDUP.

Implementation details of various examples of this technology are illustrated and described in greater detail below and with a contrast to prior conventional solutions, i.e. purely OMA based architectures. Accordingly, the following sections of examples are described based on first describing the conventional solution followed by the details of an example of this technology.

Referring to FIG. 6, an example of an architecture for optimizing an over-the-air update for a client computing device 12 which is resource constrained is illustrated with this functional block diagram. In this particular example, the device proxy computing apparatus 18 is in a cloud computing environment is introduced to take up protocol related overhead from the client computing device 12. Additionally, in this particular example LWDUP is introduced for facilitating effective and efficient communication between the device proxy computing apparatus 18 and the client computing device 12.

In this particular example, at step 120, the DM server 14 notifies the DM Transport Proxy module 38 of the device proxy computing apparatus 18 about an available update, i.e. a DM Server 14 initiated update, although the update can be initiated in other manners, such as based on a request for the update from the client computing device 12 or by a periodic check for any updates based on a stored schedule by way of example only. At step 122, the DM Transport Proxy module 38 of the device proxy computing apparatus 18 collects device capability information (DevInfo) from DM Transport Client of the client computing device 12 using the LWDUP which in turns gets it from Configuration Manager of the client computing device 12, although the information can be obtained in other manners with other low data overhead protocols. At step 134, the DM Transport Proxy module 38 of the device proxy computing apparatus 18 and the DM server 14 exchange OMA-DM commands to establish a DM Session on behalf of the client computing device 12 using the data received in step 132. At step 136, the DM Transport Proxy module 38 of the device proxy computing apparatus 18 notifies the DM Transport Client of the client computing device 12 upon completion of session establishment in step 134 using the LWDUP, although this information can be provided in other manners with other low data overhead protocols. At step 138, the DM Transport client of the client computing device 12 updates the FUMO DB of the client computing device 12 with the created session information data in step 136.

At step 140, the Download Manager of the client computing device 12 periodically monitors the FUMO DB of the client computing device 12 for a new entry and collects related information on the content server 16 from the FUMO DB of the client computing device 12 in case of a new entry in the FUMO DB of the client computing device 12. At step 142, upon finding a new entry, the Download Manager of the client computing device 12 notifies the Download Proxy module 40 of the device proxy computing apparatus 18 with relevant data on the new entry.

At step 144, the Download Proxy module 40 of the device proxy computing apparatus 18 initiates an OMA-DL Session with the content server 16 to download the update. Upon successful downloading the update, the Download Proxy module 40 of the device proxy computing apparatus 18 notifies the Download Manager of the client computing device 12 using the LWDUP, although this information can be provided in other manners with other low data overhead protocols. The Download Manager of the client computing device 12 downloads the update from the Download Proxy module 40 of the device proxy computing apparatus 18. Next, the Download Manager of the client computing device 12 updates the entry in the FUMO DB of the client computing device 12.

At step 146, the Update Manager of the client computing device 12 periodically checks the FUMO DB of the client computing device 12 for any newly downloaded update. At step 148, when the Update Manager of the client computing device 12 finds a newly downloaded upgraded software, it utilizes a device specific Updater Application of the client computing device 12 to update the client computing device 12 with the new update using a conventional patch upgrade technique, although other manners for updating could be used.

In step 150, upon completion the Update Manager of the client computing device 12 notifies the Update Proxy module 42 of the device proxy computing apparatus 18 about the status of the update, although other types and/or amounts of data and/or other information may be provided. In step 152, the Update Proxy module 42 of the device proxy computing apparatus 18 in turn notifies the DM server 14 of the status of the update, although other types and/or amounts of data and/or other information may be provided.

An Example of a Light Weight Device Update Protocol (LWDUP):

Message Format:

An example of a message format for a new LWDUP is illustrated in FIG. 7. This example of the LWDUP would consume much less memory as well as less CPU to process the message compare to OMA-DM protocol where a SyncML format is used.

CRC Algorithm:

CRC is calculated using below formula:

$$CRC = \sim \left\{ \sum_{i=0}^{n/2} Bi + \sum_{i=\frac{n}{2}+1}^{n} (Bi << 2) \right\}$$

Here,
Bi is the $i^{th}$ byte.
~ signifies 2's complement operation
Scrambling Algorithm:

```
BEGIN
    For i = 0 to n/2
        Swap (B_i, B_{i+n/2})
        B_i = B_i XOR <Seed>
    End of For
END
```

Note: <Seed> is a 2 digit random number which is generated by device proxy and shared along with AUTH_REQ message.

An example of the LWDUP message structure is illustrated in Table 1 in FIG. 8, an example of LWDUP parameter structure is illustrated in Table 2 in FIG. 9, and an example of message group and message identification (ID) is illustrated in FIG. 10. Although an example of a new LWDUP is illustrated and described herein, other types of low data weight protocols may be used with this technology to address issues with updating resource constrained devices.

Referring to FIG. 11, a timing diagram with an example of a prior conventional device management using OMA-DM is illustrated. In this particular example, the implementation is executed in two phases: a setup phase; and a management phase directly between the client computing device 12 and the DM server 14.

In the setup phase, with the package 0 the client computing device 12 receives an alert from the DM server 14. Next, with the package 1 the client computing device 12 transmits client initialization information with client credentials and device information to the DM server 14. Next, with the package 2 the DM server 14 transmits server initialization information with server credentials, initial management operations or user interaction commands from the DM server 14.

In the management phase, with the package 3 the client computing device 12 transmits a client response to server management operations to the DM server 14. With the package 4, the DM server 14 transmits more user interaction and management operations if the session is continued.

Figure 12:
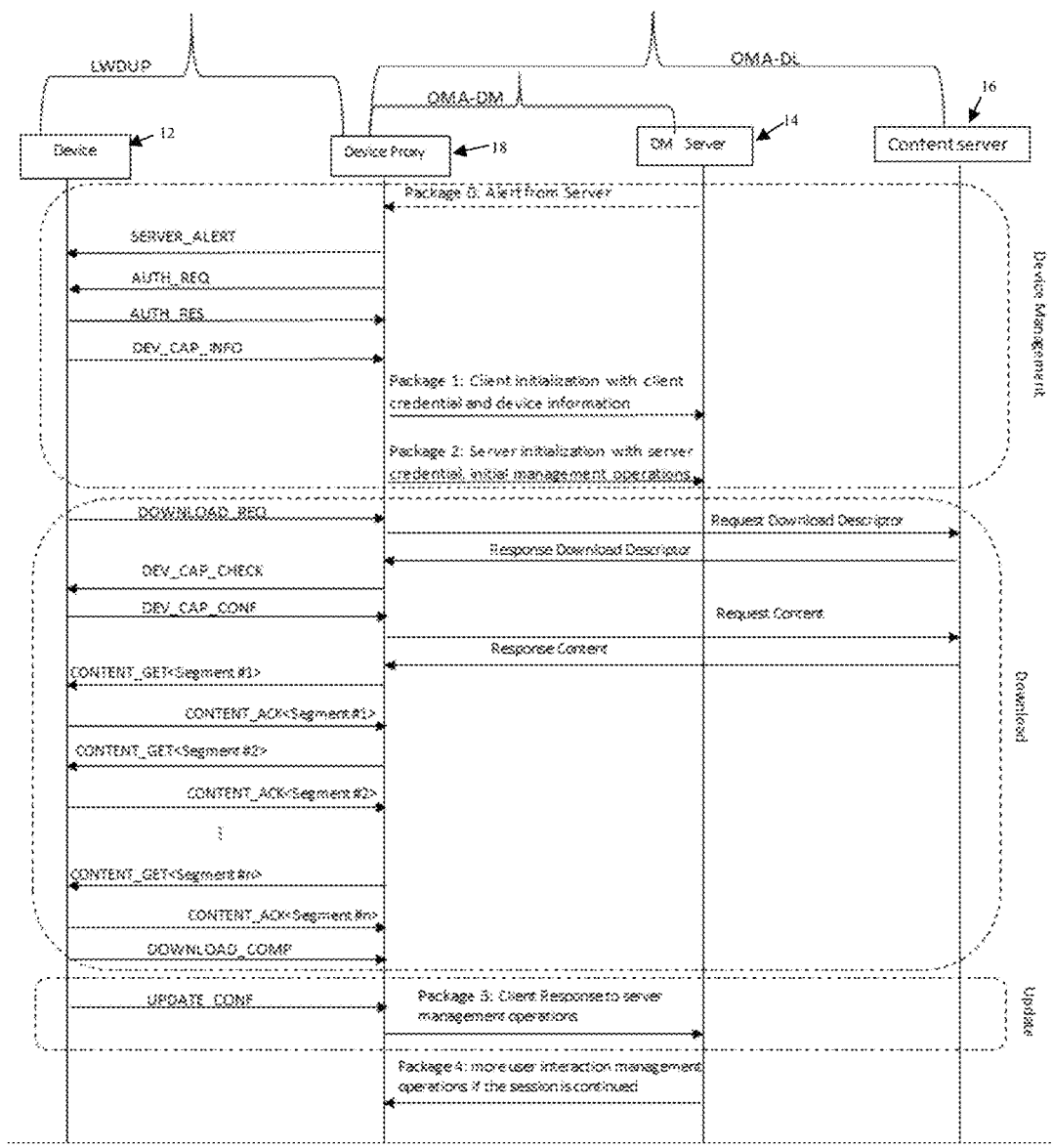
FIG. 12 is a timing diagram of an example of a method for device management using Open Mobile Alliance Device Management (OMA-DM) and LWDUP.

Referring to FIG. 12, an example of a proposed implementation for device management is illustrated. In this particular example, when Package 0 comes to the device proxy computing apparatus 18, the DM Transport Proxy module 38 of the device proxy computing apparatus 18 sends a SERVER ALERT to the DM Transport Client of the client computing device 12.

Next, authentication will happen by a challenge response method between the device proxy computing apparatus 18 and the client computing device 12 using AUTH_REQ and AUTH_RES message. Once this authentication is successfully executed, the client computing device 12 sends Device Capability details using DEV_CAP_INFO message to the device proxy computing apparatus 18.

Next upon completion of the authentication process discussed above, the DM Transport Proxy module 38 of the device proxy computing apparatus 18 builds a Package 1 which has client initialization with client credentials and device information for client computing device 12 in this example and shares it with the DM Server 14. Next, the DM Transport Proxy module 38 of the device proxy computing apparatus 18 waits for a Package 2 which has server initialization with server credentials and initial management operations for DM server 14 in this example.

Upon reception of the Package 2, the DM Transport Proxy module 38 of the device proxy computing apparatus 18 initiates a download process using DOWNLOAD_REQ message to the device proxy computing apparatus 18 using a first protocol. Next, to the device proxy computing apparatus 18 sends a Request Download Descriptor to the content server 16 and receives back from the content server 16 a Response Download Descriptor. Next, the device proxy computing apparatus 18 completes the initiation of the download process by sending a DEV_CAP_CHECK to the client computing device 12 which responds back with a DEV_CAP_CONF. Next, the device proxy computing apparatus 18 transmits a Request Content to the content server 16 and receives back from the content server 16 the Response Content for the update.

Next, the Download Manager of the client computing device 12 and the Download Proxy module 40 of the device proxy computing apparatus 18 interact with each other using a second protocol different from the first protocol, such as the LWDUP described in greater detail herein by way of example only, to download the Response Content for the update, e.g. newly available downloadable software by way of example only. Next, the device proxy computing apparatus 18 divides the Response Content for the update into a plurality of data segments which are sequentially downloaded to the client computing device 12 utilizing the second protocol, e.g. LWDUP in this example. During this process, device proxy computing apparatus 18 sends a CONTENT_GET<Segment #1 comprising one of the plurality of data segments to the client computing device 12 and if successfully received a CONTENT_ACK<Segment #1 back from the client computing device 12. This process continues until all "n" of the plurality of data segments are successfully transmitted to and acknowledged by the client computing device 12. During this division and transmission of the content into data segments, the device proxy computing apparatus 18 may monitor or otherwise detect one or more dynamic network conditions, such as available network bandwidth by way of example only, associated with the client computing device 12 during the downloading and then adaptively adjust a size of dividing the Response Content for the update based on the monitored or otherwise detected one or more dynamic networks conditions.

Upon completion of download process, the Update Manager of the client computing device 12 updates the client computing device 12 using the Updater Application. Upon completion of the update by the client computing device 12, the update result, e.g. a success or failure, would be sent by the client computing device 12 to Update Proxy module 42 of the device proxy computing apparatus 18 using UPDATE_CONF message.

Upon receiving the update result, the Update Proxy module 42 in the device proxy computing apparatus 18 will build a Package 3 which has the response from the client computing device 12 to the server management operations and sends it to the DM Server 14. Next, the DM server 14 builds and sends a package 4 which has more user interaction and management operations if the session is continued to the device proxy computing apparatus 18.

Figure 13:
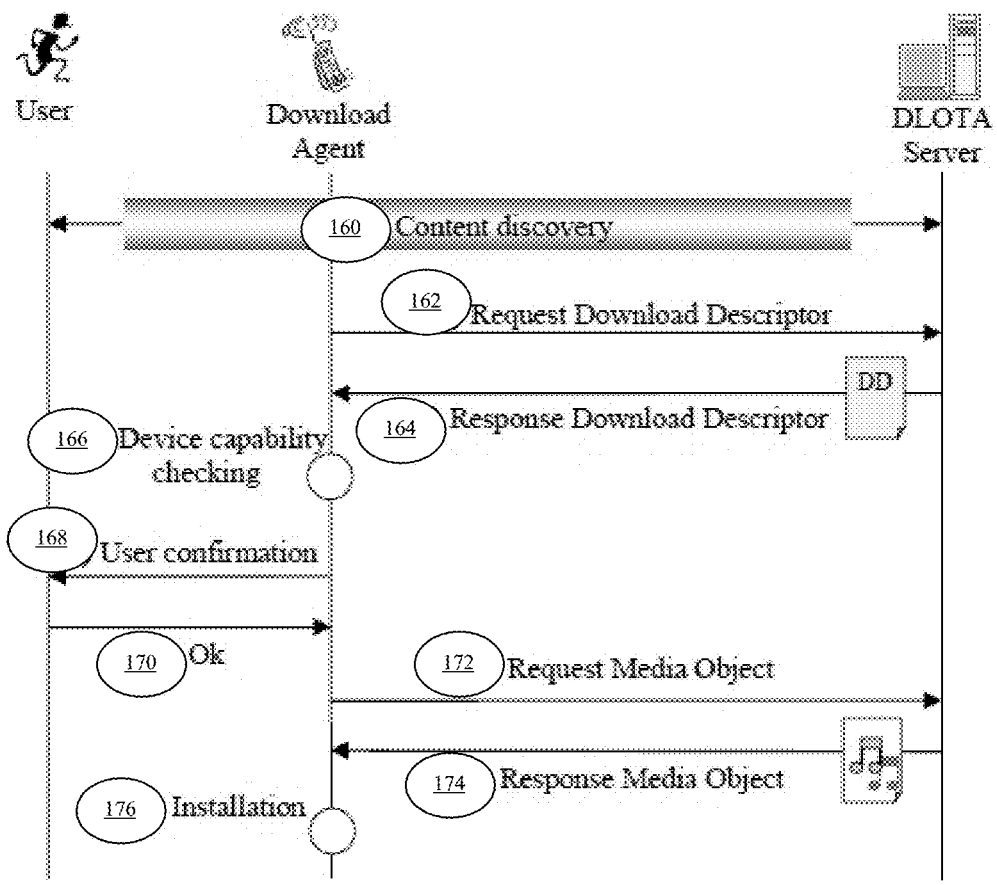
FIG. 13 is a timing diagram of an example of a method for a conventional download using Open Mobile Alliance Download Over-The Air (OMA-DL)

Referring to FIG. 13, a conventional download implementation using OMA-DL is as shown. In step 160, a download agent of a User computing device interacts with a Download Over-The-Air (DLOTA) Server to discover content. In step 162, the download agent of the User computing device requests a download descriptor. In step 164, the DLOTA Server provides a respond download descriptor to the download agent of the User computing device. In step 166, the download agent of the User computing device checks the capabilities of the User computing device. In step 168, the download agent of the User computing device requests user confirmation and in step 170 a response to the request is received. In step 172, the download agent of the User computing device requests the Media Object from the DLOTA Server. In step 174, the DLOTA Server provides the Media Object to the download agent of the User computing device. In step 174, the Media Object is installed in the User computing device.

Figure 14:
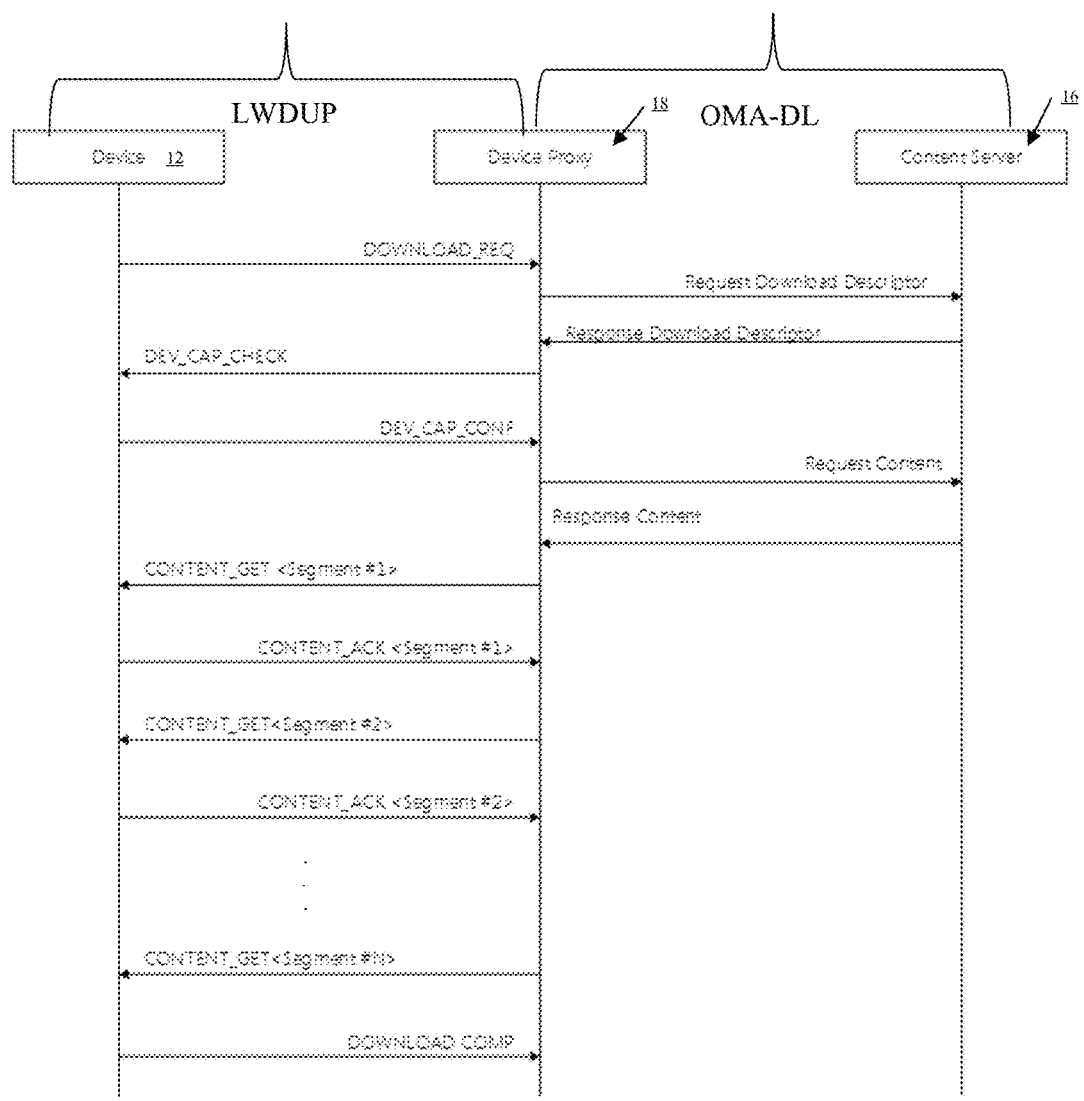
FIG. 14 is a timing diagram of an example of a method for content download using OMA-DL and LWDUP.

Referring to FIG. 14, a timing diagram illustrating an example of an implementation for content download using LWDUP is illustrated. In this particular example, the Download Manager of the client computing device 12 initiates Download process with the content server information using DOWNLOAD_REQ message to the device proxy computing apparatus 18. Next, the Download Proxy module 40 of the device proxy computing apparatus 18 requests for a Download Descriptor (DD) from the content server 16.

Upon receiving Download Descriptor from the content server 16, the Download Proxy module of the device proxy computing apparatus 18 checks the device capability of the client computing device 12 using a DEV_CAP_CHECK message. The Download Manager of the client computing device 12 responds back with device capability information using a DEV_CAP_CONF message to the device proxy computing apparatus 18.

If the client computing device 12 has enough memory, the Download Proxy module 40 of the device proxy computing apparatus 18 requests for content, such as the update, from the content server 16. Upon receiving full content from the content server 16, the Download Proxy module 40 of the device proxy computing apparatus 18 segments the content and sequentially sends the segmented content to the Download Manager of the client computing device 12 using an ACK/NACK protocol. The particular segment size depends on the limitation of MODEM of device and/or other detected network capabilities by the device proxy computing apparatus 18. The device proxy computing apparatus 18 sends a CONTENT_GET message to send the first segment of the content to the client computing device 12. The client computing device 12 in turn sends a _ACK message once it acknowledges the segment of the content. This process continues until all of the segments of the content are successfully sent and then the Download Manager of the client computing device 12 re-assembles all the segments and then sends a DOWNLOAD_COMP response to the Download Proxy module of the device proxy computing apparatus 18.

One of the advantages of this example of downloading the content is that if content transfer of one of the segments fails, then the device proxy computing apparatus 18 can resume the transmission in the new session from the last successfully received segment of the content. This mechanism helps to improve the throughput especially when connection quality to the client computing device 12 is poor. The device proxy computing apparatus 18 may send an ADAPT_DEV_CAP message with adjusted segment size depending on the number of identified segments lost based on missing ACK/NACK. Upon receipt of the message, the client computing device 12 confirms this change using DEV_CAP_CONF message.

To enhance security, the device proxy computing apparatus 18 may send a SCRAMBLE_CONTENT_REQ and follows a scrambling algorithm to scramble the update also referred to as the content herein. The client computing device 12 will responds with a Support/Not Support using SCRAMBLE_CONTENT_CONF message.

FUMO Tree Customization

Figure 15:
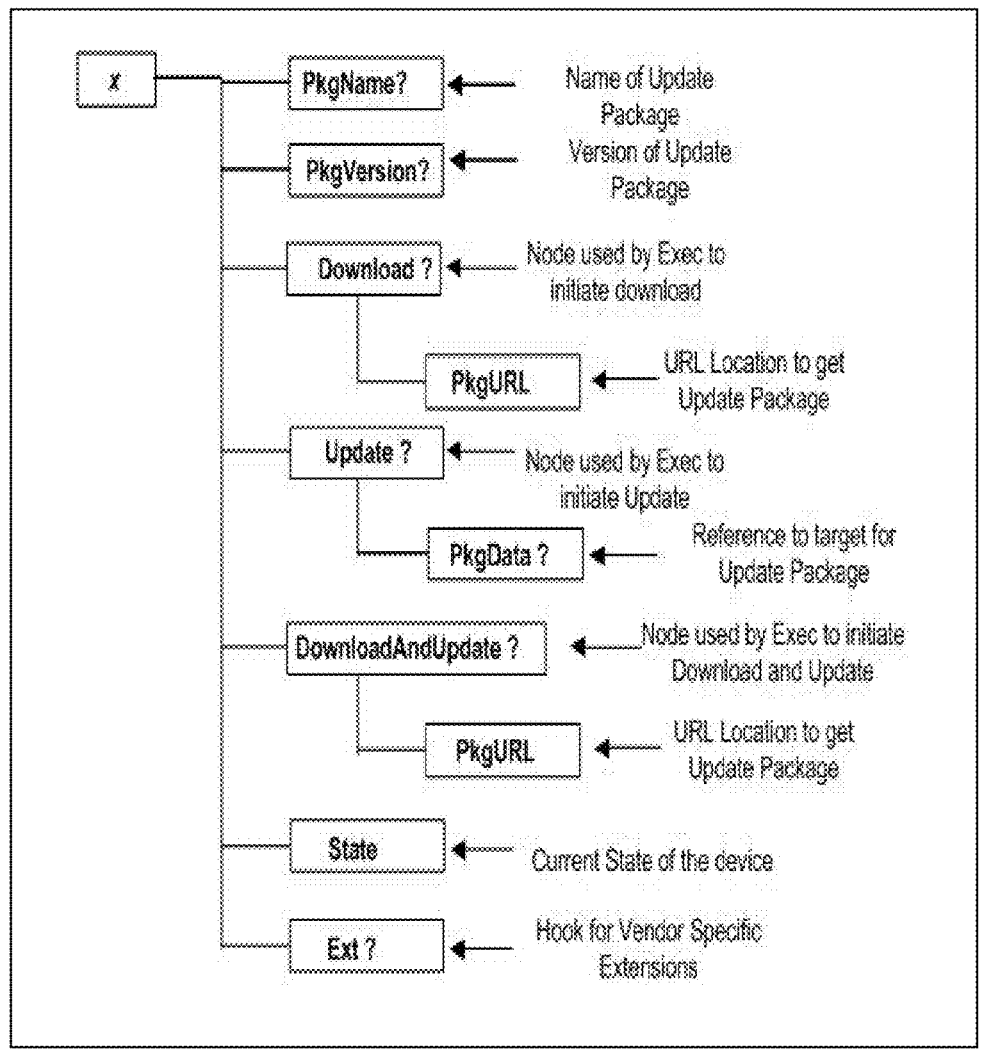
FIG. 15 is a diagram of a conventional Firmware Update Management Object (FUMO) tree.
Figure 16:
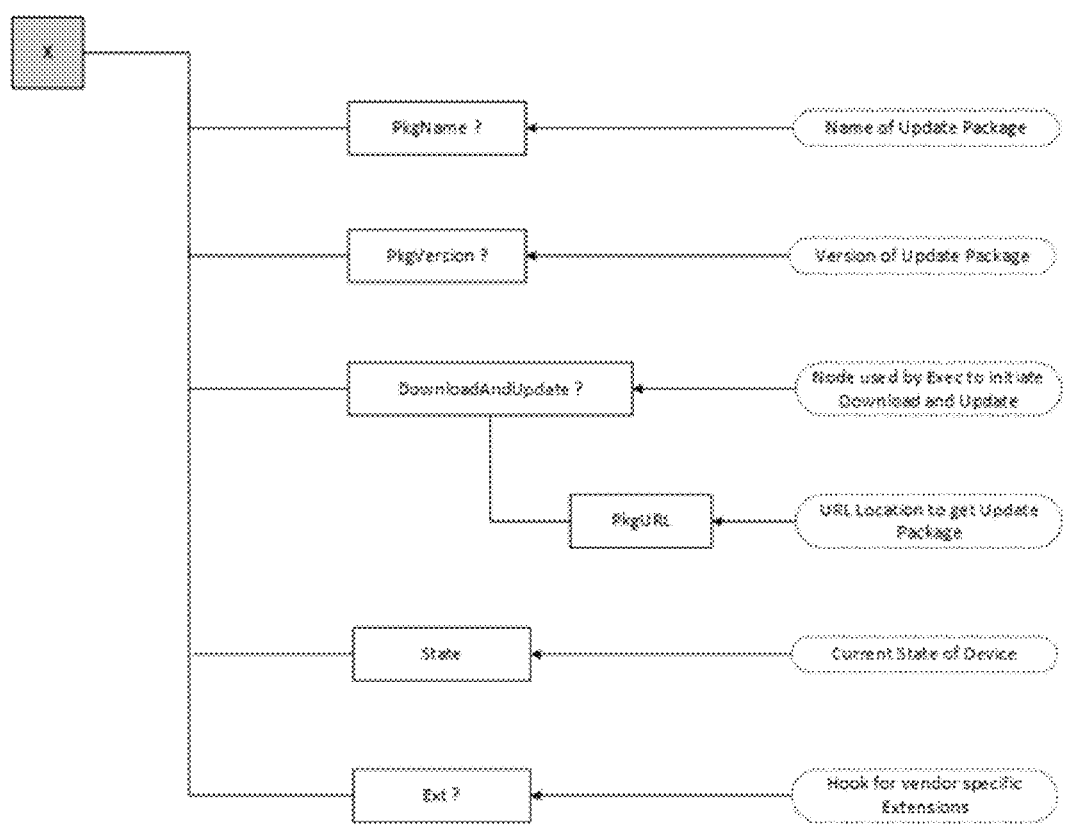
FIG. 16 is a diagram of a FUMO tree for an example of this technology.

Referring to FIG. 15, an example of a Firmware Update Management Object Database (FUMO) Tree conventionally used during Device Management to store current status of device is illustrated. Referring to FIG. 16, an example of a customized Firmware Update Management Object Database (FUMO) tree maintained in the device in this innovation is shown to save flash memory. In this example, the DM Transport proxy module 38 in the device proxy computing apparatus 18 internally takes care of other management commands, i.e.; Exec command, and issues only a Download and Update command to the DM Transport Client of the client computing device 12. In this example, the customized FUMO tree is stored in fix address of flash memory of the device proxy computing apparatus 18 in a flat file format.

State Management Customization

Figure 17:
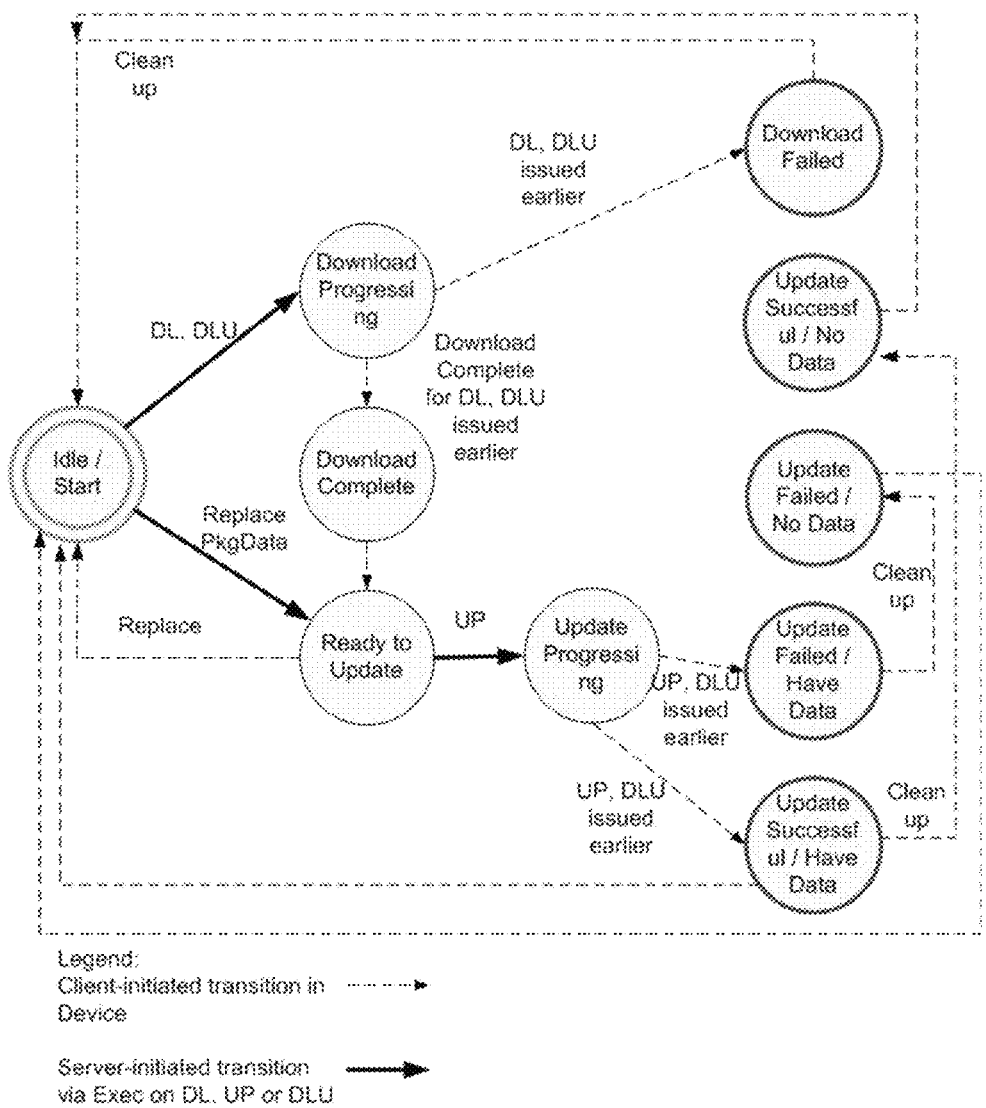
FIG. 17 is a firmware update state diagram for an example of this technology.
Figure 18:
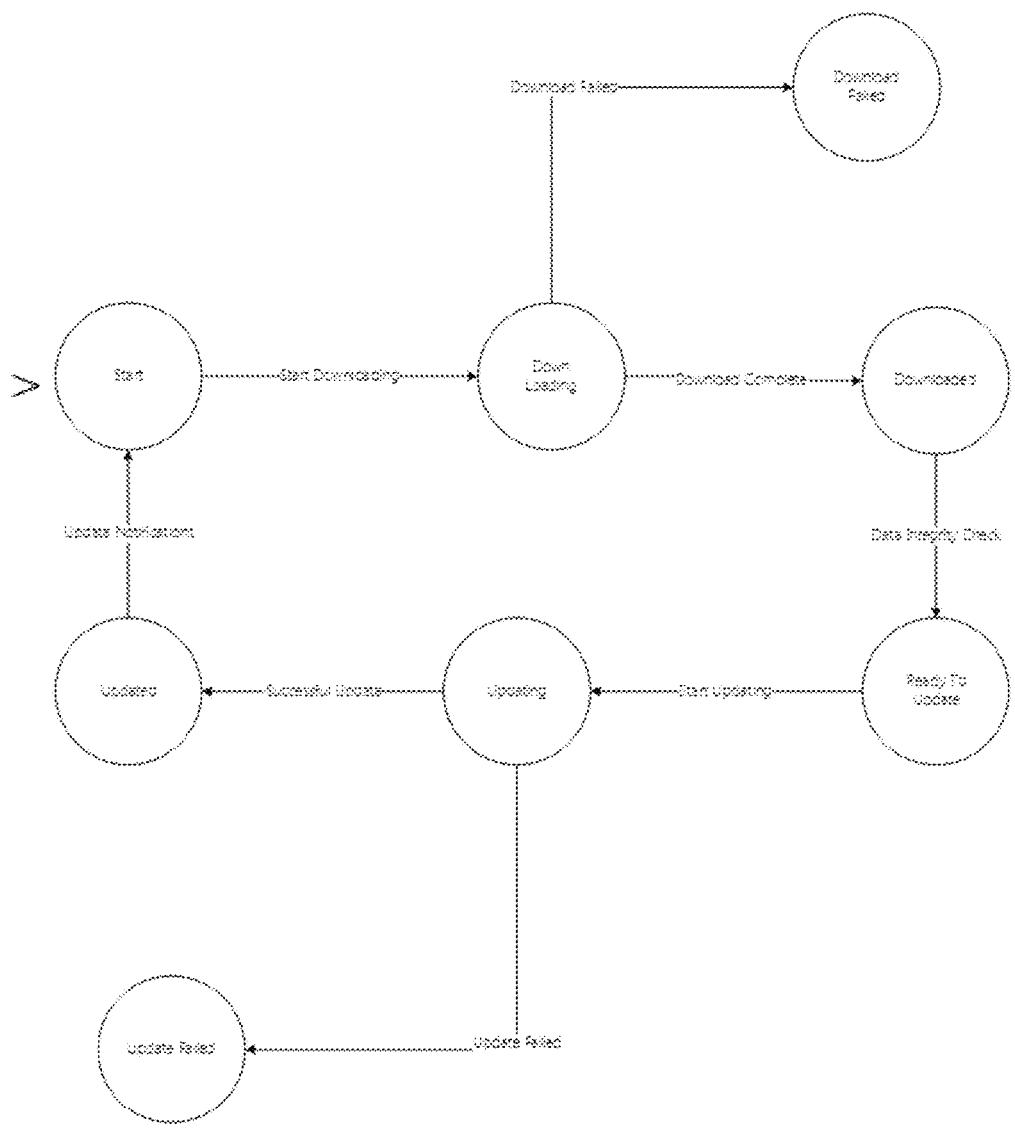
FIG. 18 is a diagram of a device state management for an example of this technology.

Referring to FIG. 17, the device proxy computing apparatus 18 may maintain a state machine as illustrated. Additionally, a simplified state machine as shown in FIG. 18 is followed for the client computing device 12 for efficient usage of memory and CPU. Other OMA-DM command would be consumed by the device proxy computing apparatus 18 and the state field as shown in FIG. 16 would be updated with current state information.

Set Forth Below is a Comparison of Performance Analysis of an Example of this Technology with a Prior System:

A prior OMA-DM approach requires approx 4.5 KB of control data transmission to be made by client computing device 12 for a successful device update. With an example of this technology, less than 500 Bytes and approximately 400 Bytes of control data transmission would be required by the client computing device 12 for a successful device update.

This reduction in control data transfer generates benefits in one or forms stated below:

No SyncML parsing is needed by the client computing device 12. Instead, with example of this technology it would be taken care at the device proxy computing apparatus 18 in a cloud or other computing environment and thus will be much faster. Additionally, the new compact message format designed in the new LWDUP will speed up the processing at the client computing device 12 because of the lower processing power require.

The prior OMA-DL approach requires the client computing device 12 to perform Download Descriptor processing which requires 2K Bytes of data transmission approximately is eliminated with examples of this technology.

The prior OMA-DL approach does not support segmentation of the content to be transferred. However, example of this technology provide for adaptive segmentation which helps to improve performances by adapting the download to the dynamic network condition or conditions.

Interoperability

With examples of this technology, the device proxy computing apparatus 18 uses OMA-DM and OMA-DL for communicating with the DM server 14 and the content server 16 respectively, which takes care of inter-operability from the perspective of the DM server 14 and the content server 16 and uses LWDUP for communication between the device proxy computing apparatus 12 and the client computing device 12 which helps to leverage existing content delivery mechanisms.

Accordingly, as illustrated and described by way of reference to the examples herein, this technology provides methods, devices, and non-transitory computer readable media that optimize implementation of an over-the-air update for a resource constrained device. With this technology, OTA downloads of updates to resource constrained computing devices is substantially improved. Example of this technology reduce the data overhead while downloading an OTA update to a resource constrained computing device by introducing a device proxy computing apparatus between the entities from which the data is downloaded and the resource constrained computing device. Additionally, examples of this technology may also utilize a new light weight device update protocol (LWDUP) for secure and robust communication, i.e. can work in relatively poorer network coverage, which reduces the overhead both from protocol semantics and syntax to facilitate completion of the OTA update. Further, examples of this technology are able to dynamically adjust the segmenting during the downloading of the update based on detecting and adapting to dynamic network conditions.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for optimizing an over-the-air (OTA) update, the method comprising:
   identifying, by a device proxy computing apparatus, initiation of an OTA update for a client computing device;
   retrieving, by the device proxy computing apparatus, the OTA update from a content server based on the identifying and utilizing a first protocol;
   adaptively dividing, by the device proxy computing apparatus, the retrieved OTA update into a plurality of data segments based on dynamic network condition and device capability associated with the client computing device;
   sequentially downloading, by the device proxy computing apparatus, the plurality of data segments associated with the OTA update in a first session to the client computing device utilizing a second protocol which is different from the first protocol; and
   resuming, by the device proxy computing apparatus, the downloading of one or more remaining data segments from the plurality of data segments associated with the OTA update to the client computing device, in a new session, based on a last data segment received by the client computing device in the first session.

2. The method as set forth in claim 1 wherein the identifying the initiation further comprises:
   receiving, by the device proxy computing apparatus, a request for the OTA update from the client computing device; and
   initiating, by the device proxy computing apparatus, the OTA update based on the received request.

3. The method as set forth in claim 1 wherein the identifying the initiation further comprises:
   monitoring, by the device proxy computing apparatus, for the OTA update for the client computing device based on a stored update schedule; and
   initiating, by the device proxy computing apparatus, the OTA update based on the monitoring of the stored update schedule.

4. The method as set forth in claim 1 wherein the second protocol is a light weight device update protocol, and requires transmission of no more than five hundred bytes of control data to complete the update.

5. The method as set forth in claim 1 wherein the dividing further comprises:
   detecting, by the device proxy computing apparatus, at least one dynamic network condition associated with the client computing device during the downloading.

6. A device proxy computing apparatus, the apparatus comprising:
   a processor;
   a memory coupled to the processor which is configured to be capable of executing programmed instructions, which comprise the programmed instructions stored in the memory to:
   identify initiation of an over-the-air update (OTA) for a client computing device;
   retrieve the OTA update from a content server based on the identifying and utilizing a first protocol;
   adaptively divide the retrieved OTA update into a plurality of data segments based on dynamic network condition and device capability associated with the client computing device;
   sequentially download the plurality of data segments associated with the OTA update in a first session to the client computing device utilizing a second protocol which is different from the first protocol; and
   resume the download of one or more remaining data segments from the plurality of data segments associated with the OTA update to the client computing device, in a new session, based on a last data segment received by the client computing device in the first session.

7. The apparatus as set forth in claim 6 wherein the programmed instruction to identify initiation further comprises instructions to:
   receive a request for the OTA update from the client computing device; and
   initiate the OTA update based on the received request.

8. The apparatus as set forth in claim 6 wherein the programmed instruction to identify initiation further comprises instructions to:
   monitor for the OTA update for the client computing device based on a stored update schedule; and
   initiate the OTA update based on the monitoring of the stored update schedule.

9. The apparatus as set forth in claim 6 wherein the second protocol is a light weight device update protocol, and requires transmission of no more than five hundred bytes of control data to complete the update.

10. The apparatus as set forth in claim 6 wherein the programmed instruction to download the update further comprises instructions to:
    detect at least one dynamic network condition associated with the client computing device during the download.

11. A non-transitory computer readable medium having stored thereon instructions for optimizing an (OTA) update comprising machine executable code which when executed by a processor, causes the processor to perform steps to and that comprise:
    identify initiation of an OTA update for a client computing device;
    retrieve the OTA update from a content server based on the identifying and utilizing a first protocol; and
    adaptively divide the retrieved OTA update into a plurality of data segments based on dynamic network condition and device capability associated with the client computing device;
    sequentially download the plurality of data segments associated with the OTA update from the device proxy computing apparatus to the client computing device utilizing a second protocol which is different from the first protocol; and
    resume, by the device proxy computing apparatus, the downloading of one or more remaining data segments from the plurality of data segments associated with the OTA update to the client computing device, in a new session, based on a last data segment received by the client computing device in the first session.

12. The medium as set forth in claim 11 wherein the identify the initiation further comprises:

receive a request for the OTA update from the client computing device; and initiate the OTA update based on the received request.

13. The medium as set forth in claim 11 wherein the identifying the initiation further comprises:

monitor for the OTA update for the client computing device based on a stored update schedule; and initiate the OTA update based on the monitoring of the stored update schedule.

14. The medium as set forth in claim 11 wherein the second protocol is a light weight device update protocol, and requires transmission of no more than five hundred bytes of control data to complete the update.

15. The medium as set forth in claim 11 wherein the download the OTA update further comprises:

detect at least one dynamic network condition associated with the client computing device during the downloading.

16. The method of claim 1, wherein the first protocol is an Open Mobile Alliance Download Over-The Air (OMA-DL) protocol.

17. The method of claim 1, further comprising:

scrambling the plurality of data segments associated with the OTA update using a scrambling algorithm;

determining compatibility of the client computing device for receiving the OTA update in scrambled manner, wherein if the client computing device is compatible then sending the plurality of data segments associated with the OTA update using a scrambling algorithm to the client computing device; and wherein if the client computing device is not compatible then sending the plurality of data segments associated with the OTA update in the sequential manner to the client computing device.

* * * * *